(12) United States Patent
Kuo et al.

(10) Patent No.: US 8,955,351 B2
(45) Date of Patent: Feb. 17, 2015

(54) ENERGY STORABLE AIR CONDITIONING DEVICE

(75) Inventors: Dah-Chyi Kuo, Kunshan (CN); Xue-Hai Wang, Kunshan (CN); Ling Long, Kunshan (CN)

(73) Assignee: Kunshan Jue-Chung Electronics Co., Ltd., Jiangsu (CN)

( * ) Notice: Subject to any disclaimer, the term of this patent is extended or adjusted under 35 U.S.C. 154(b) by 430 days.

(21) Appl. No.: 13/417,422

(22) Filed: Mar. 12, 2012

(65) Prior Publication Data

US 2013/0235518 A1 Sep. 12, 2013

(51) Int. Cl.
*F25D 17/04* (2006.01)

(52) U.S. Cl.
USPC .............................................. 62/406; 62/530

(58) Field of Classification Search
USPC ............. 62/406, 407, 411, 414, 457.2, 457.5, 62/463, 530
See application file for complete search history.

(56) References Cited

U.S. PATENT DOCUMENTS

| | | | | |
|---|---|---|---|---|
| 4,309,980 A | * | 1/1982 | McCormack et al. | ... 126/263.05 |
| 4,691,274 A | * | 9/1987 | Matouk et al. | ................ 363/141 |
| 5,518,069 A | * | 5/1996 | Maier-Laxhuber et al. | ........................ 165/104.12 |
| 5,910,163 A | * | 6/1999 | Schlamp | ......................... 62/256 |
| 7,481,064 B2 | * | 1/2009 | Kitanovski et al. | ............. 62/3.1 |
| 2005/0172660 A1 | * | 8/2005 | Anderson | ....................... 62/435 |
| 2011/0296865 A1 | * | 12/2011 | Yuan et al. | ...................... 62/430 |

* cited by examiner

*Primary Examiner* — Melvin Jones
(74) *Attorney, Agent, or Firm* — Chun-Ming Shih; HDLS IPR Services (57) ABSTRACT

An energy storable air conditioning device includes a main body, at least one air blower module and at least one energy storage module. The main body has an air inlet, an air outlet and several receiving spaces connected to each other and disposed between the air inlet and the air outlet. The air blower module includes a first drawer inserted into one of the receiving spaces and a fan disposed in the first drawer. The energy storage module includes a second drawer inserted into another one of the receiving spaces and an energy storage unit disposed in the second drawer. The first drawer is connected to the second drawer.

16 Claims, 10 Drawing Sheets

ENERGY STORABLE AIR CONDITIONING DEVICE

BACKGROUND OF THE INVENTION

1. Field of the Invention

The invention is related to an energy storable device, and in particularly related to an energy storable air conditioning device.

2. Description of the Related Art

Air conditioning devices are often used to reduce indoor temperature in the day time or in summer or used to reduce temperature of a refrigerator. They are also used to raise indoor temperature at night or in winter or used to raise temperature of a dryer. To supply cool air or warm air for temperature regulation, the air conditioning devices may consume large electrical energy.

Since the air conditioning devices consumes large energy and the refrigerant used in the air conditioning devices may pollute environment, an energy storable air conditioning device is desired. Such an energy storable air conditioning device may include a seat and an energy storage unit. The seat has a first air entrance and a second air entrance, and a first fan and a second fan are disposed in the first air entrance and the second air entrance respectively. The energy storage unit disposed in the seat has energy storage material in which energy is stored or released as latent heat during phase change. After the air conditioning device is turned off, the energy storage unit continues to provide cooling or heating effect.

However, since the positions of the fan and the energy storage unit are fixed, the fan and the energy storage unit cannot be moved to change the configuration arbitrarily, and the number of the fan and the energy storage unit, which related to the efficiency of the air conditioning device, cannot be changed either. In addition, when some of the energy storage unit fails, which cause reduction of the cooling or heating ability, it is inconvenient to replace them.

BRIEF SUMMARY OF THE INVENTION

The object of the invention is to provide an energy storable air conditioning device including modularized fan and energy storage unit, which facilitates expansion and replacement of fan and energy storage unit so as to obtain excellent regulation efficiency.

The invention provides an energy storable air conditioning device including a main body, at least one air blower module and at least one energy storage module. The main body has an air inlet, an air outlet and several receiving spaces connected to each other and disposed between the air inlet and the air outlet. The air blower module includes a first drawer inserted into one of the receiving spaces and a fan disposed in the first drawer. The energy storage module includes a second drawer inserted into another one of the receiving spaces and an energy storage unit disposed in the second drawer. The first drawer is connected to the second drawer.

The invention provides an energy storable air conditioning device including at least one air blower module and at least one energy storage module. The air blower module includes a first main body and a fan disposed in the first drawer. The energy storage module includes a second main body and an energy storage unit disposed in the second main body. The first main body is connected to the second main body.

As the energy storage unit is modularized, it is convenient to replace the failed energy storage unit so as to recover cooling or heating ability of the energy storable air conditioning device to maintain excellent efficiency.

In addition, because phase change material has large heat storage capacity, it is maintained at melting point for a long time to absorb heat or release heat for cooling or heating so as to save energy.

Furthermore, the energy storable air conditioning device of the invention includes an air intake module filtering air flow at the air inlet to provide better air quality. In addition, the energy storable air conditioning device of the invention further includes a seat which supports a main body (or a third main body) and has a distance from ground to facilitate air flowing into the seat through the air inlet. The energy storable air conditioning device of the invention further includes a cover, and an air guide slot is formed on the cover to guide hot or cool air flow to a desired position to lift efficiency of the air conditioning device.

In addition, the air blower and energy storage unit is modularized to facilitate expansion or replacement. The number of air blower module and energy storage module can be increased or decreased depending on requirement. The positions of the air blower module and energy storage module can also be adjusted for easy operation of the air conditioning device.

A detailed description is given in the following embodiment with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

FIGS. 1 to 5 depict an energy storable air conditioning device of the invention. The energy storable air conditioning device includes a main body 1, at least one air blower module 2 and at least one energy storage module 3.

An air inlet 12 and an air outlet 13 are formed on the bottom side and the top side of the main body 1 respectively. Several receiving spaces 112 which are connected to each other are formed between the air inlet 12 and the air outlet 13. The main body 1 includes several stacked frames 11. Each frame 11 has an opening 111 formed on one of lateral sides, and one of the receiving spaces 112 is formed in the frame 11 and corresponds to the opening 111. Since top and bottom of each frame 11 are opened, when the frames 11 are stacked, the opened top side and bottom side of the stacked structure of the frames 11 serve as the air outlet 13 and air inlet 12 respectively.

Each air blower module 2 includes a first drawer 21 and a fan 22 disposed in the first drawer 21. The first drawer 21 is inserted into one of the receiving spaces 112. The bottom side of the first drawer 21 has a meshed or porous structure 211. Each energy storage 3 includes a second drawer 31 inserted into another one of the receiving spaces 112 and an energy storage unit 32 disposed in the second drawer 31. The second drawer 31 also has a meshed or porous structure 311 on its bottom side corresponding to the meshed or porous structure 211. The first drawer 21 is connected to the second drawer 31 and air flows from the first drawer 21 to the second drawer 31 by passing the meshed or porous structure 211 and the meshed or porous structure 311. The energy storage unit 32 includes several energy storage elements 321. Each energy storage elements 321 is filled with phase change material. The phase change material includes salt-like phase change material or ozocerite-like material. The phase change material can be flake-shaped, spherical or triangular to increase air contact area.

The energy storable air conditioning device of the invention further includes an air intake module 4. The air intake module 4 includes a third drawer 41 inserted into another one of the receiving space 112 and a filtering unit 42 disposed in the third drawer 41. The bottom of the third drawer 41 has a meshed or porous structure 411 corresponding to the air inlet 12. The first drawer 21, the second drawer 31 and the third drawer 41 are connected to each other so that air flow passes through the first drawer 21, the second drawer 31 and the third drawer 41. Although the meshed or porous structure 411 is disposed on the bottom side of the third drawer 41 for the air inlet 12 in FIGS. 1 to 5, it is not limited thereto. The meshed or porous structure 411 can be disposed in other positions according to requirement.

The energy storable air conditioning device of the invention further includes a seat 5 disposed on the bottom side of the main body 1. The seat 5 has several feet or wheels to keep the seat 5 away from the ground for a distance and move the energy storable air conditioning device easily. A venting portion 51 corresponding to the air inlet 12 is formed on the top side of the seat 5. The venting portion 51 can be a meshed or porous structure or an opening.

The energy storable air conditioning device of the invention further includes a cover 6. The cover 6 is disposed on one side of the main body 1 and has an air guide slot 61 corresponding to the air outlet 13. Although the cover 6 is disposed on the top side of the main body 1 in this embodiment to guide air from the air outlet 13, it is not limited thereto. The cover 6 can be disposed in other positions according to requirement.

In the energy storable air conditioning device of the invention, the main body 1 has the air inlet 12, the air outlet 13 and several receiving spaces 112. Each air blower module 2 includes the first drawer 21 inserted into one of the receiving spaces 112 and the fan 22 disposed in the first drawer 21. Each energy storable module 3 includes the second drawer 31 inserted into another one of the receiving spaces 112 and the energy storage unit 32 disposed in the second drawer 31. The first drawer 21 is connected to the second drawer 31.

Figure 1:
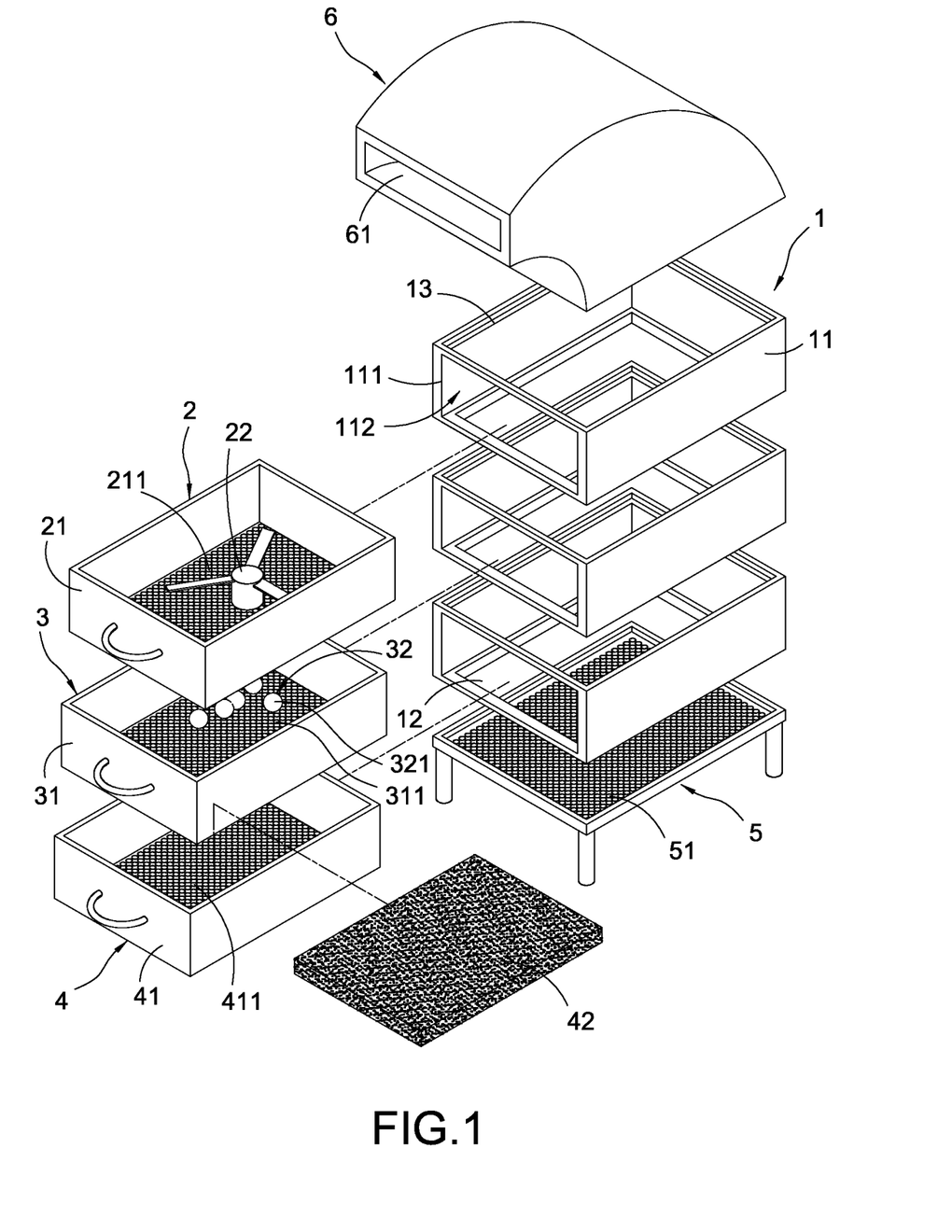
FIG. 1 is a perspective exploded view of the first embodiment of an energy storable air conditioning device of the invention.
Figure 2:
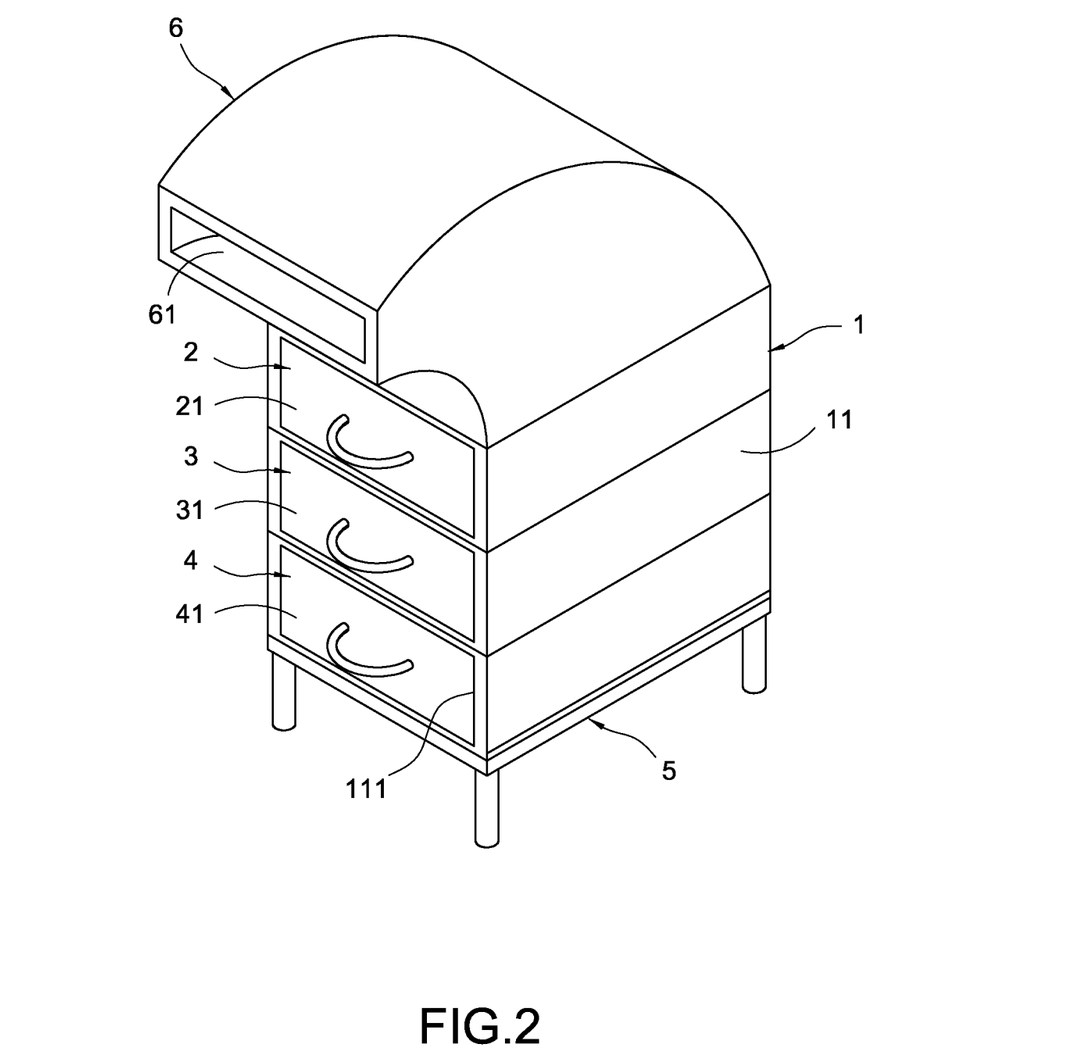
FIG. 2 is a schematic view of the first embodiment of an energy storable air conditioning device of the invention.
Figure 3:
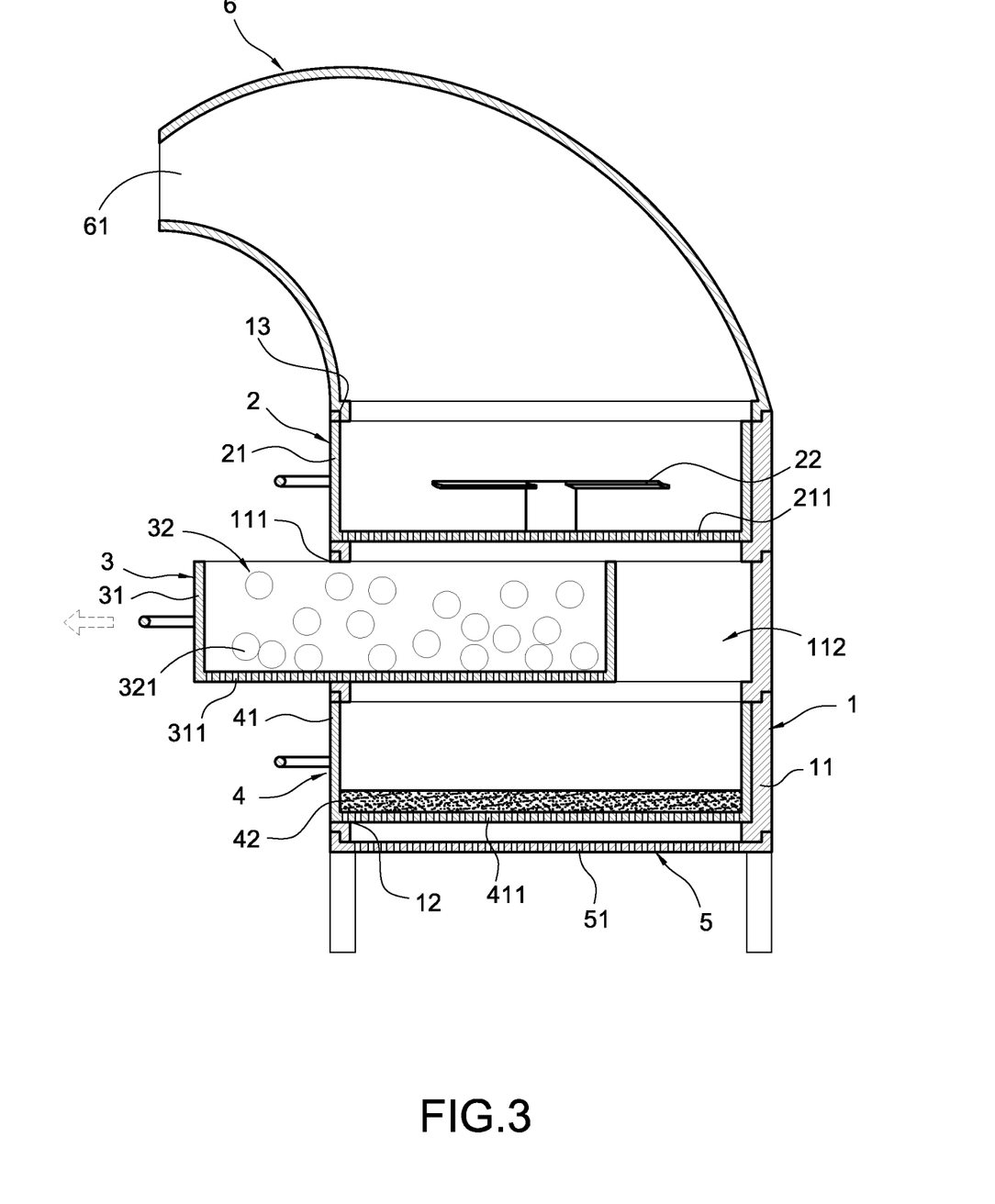
FIG. 3 is another schematic view of the first embodiment of an energy storable air conditioning device of the invention.

Referring to FIG. 3, the energy storage module 3 is disposed in the second drawer 31, and the energy storage unit 32 is modularized to facilitate replacement. When one energy storage unit 32 fails, only the energy storage unit 32 is replaced.

Figure 4:
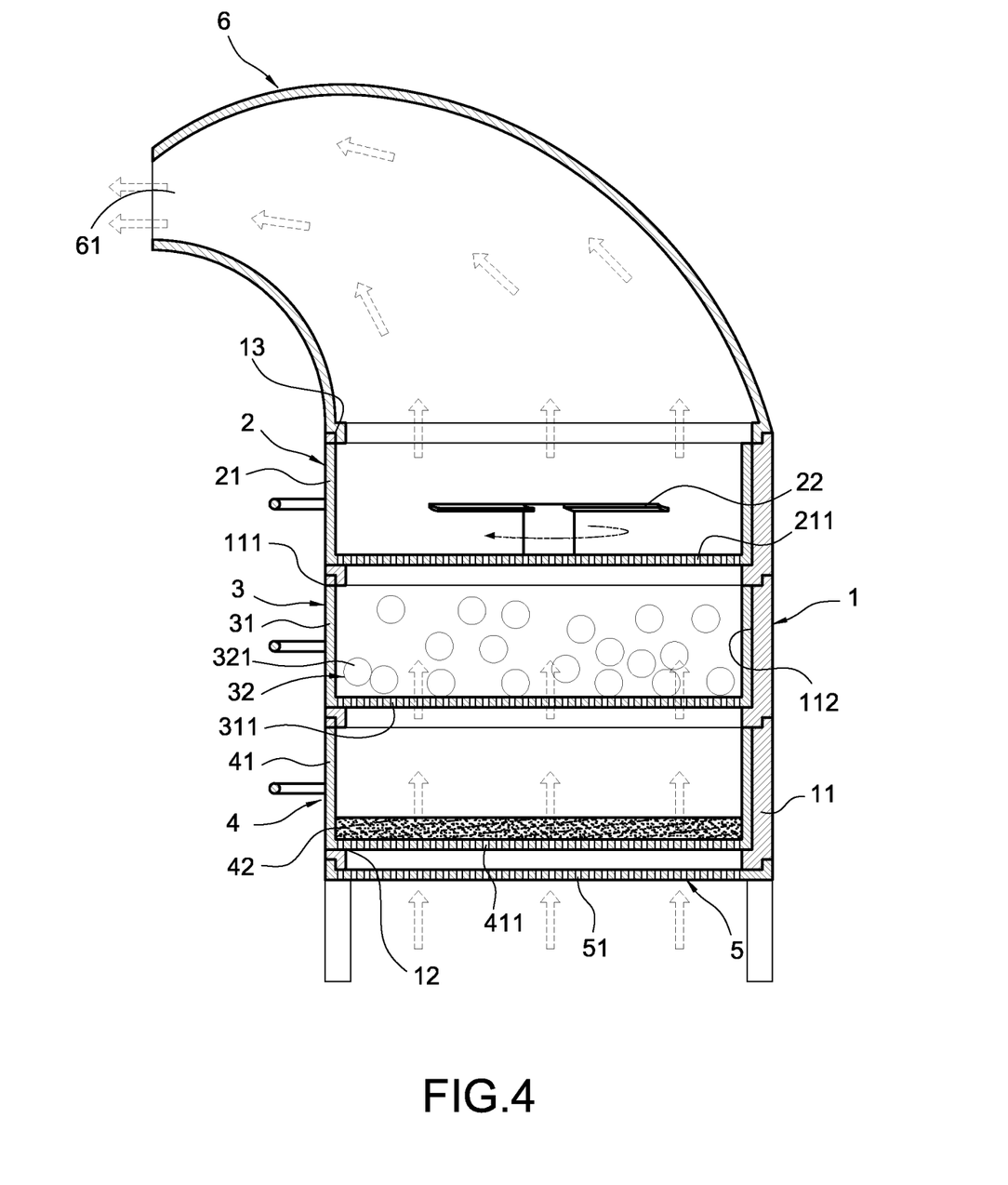
FIG. 4 is another schematic view of the first embodiment of an energy storable air conditioning device of the invention.

Referring to FIG. 4, the energy unit 3 includes a cool-storage unit having material with melting point ranged 5° C.~26° C. and a heat-storage unit having material with melting point ranged 30° C.~68° C. The cool-storage unit is pre-cooled at off-peak time (at night) and used for cooling when necessity. When the cool-storage unit is used for cooling, air flows into the first drawer 21 via the air inlet 12 by means of the fan 22. Since the air from outside has a temperature higher than the melting point of the cool-storage unit, the cool-storage unit absorbs heat of air and melts. The air, therefore, flowing form the air outlet 13 has a reduced temperature to cool a refrigerator or an indoor environment. Similarly, the heat-storage unit is pre-heated at off-peak time (at night) and used for heating when necessity. When the heat-storage unit is used for heating, air flows into the first drawer 21 via the air inlet 12 by means of the fan 22. Since the air from outside has a temperature lower than the melting point of the heat-storage unit, the heat-storage unit release heat to air and solidifies. The air, therefore, flowing form the air outlet 13 has a raised temperature to heat an indoor environment. Since the phase change material has a large heat capacity, it is maintained at the melting point to provide cooling or heating function continuously for a long time so as to save energy.

The energy storable air conditioning device of the invention includes an air intake module 4 filtering air through the air inlet 12 to provide better air quality. The energy storable air conditioning device of the invention further includes a seat 5 supporting the main body 1 and keeping the main body 1 from the ground for a distance to facilitate air entrance to the main body 1 via the air inlet 12. The cover 6 has an air guide slot 61 guiding air flow to a desired position.

Figure 5:
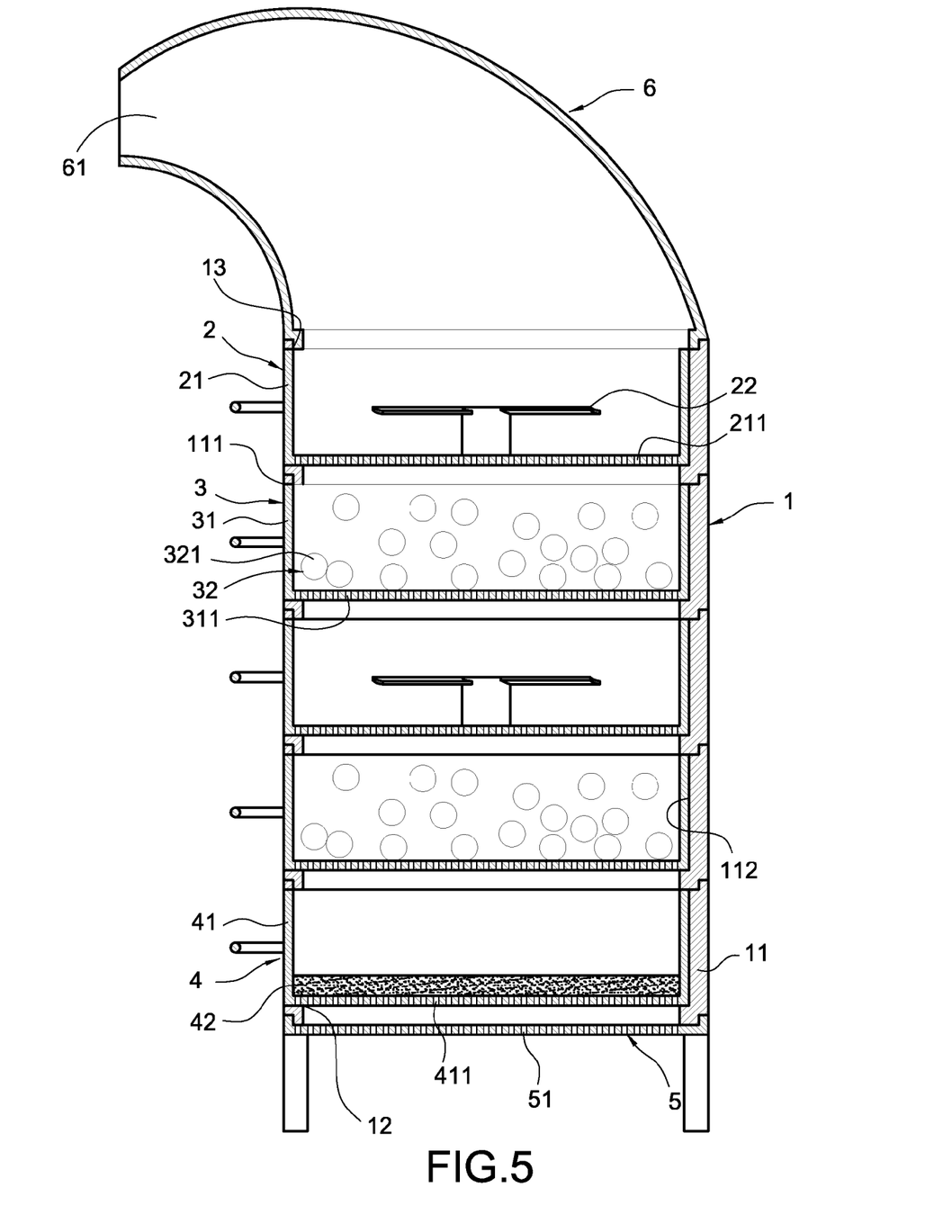
FIG. 5 is another schematic view of the first embodiment of an energy storable air conditioning device of the invention.

As shown in FIG. 5, the energy storage module 3 is disposed in the second drawer 31, and the fan 22 is disposed in the first drawer 21. The air blower module 22 and energy storage module 3 are modularized to facilitate expansion and replacement. The number of air blower module 2 and energy storage module 3 can be increased or decreased according to requirement. The positions of the air blower module 2 and energy storage module 3 can also be changed for easy operation.

Figure 6:
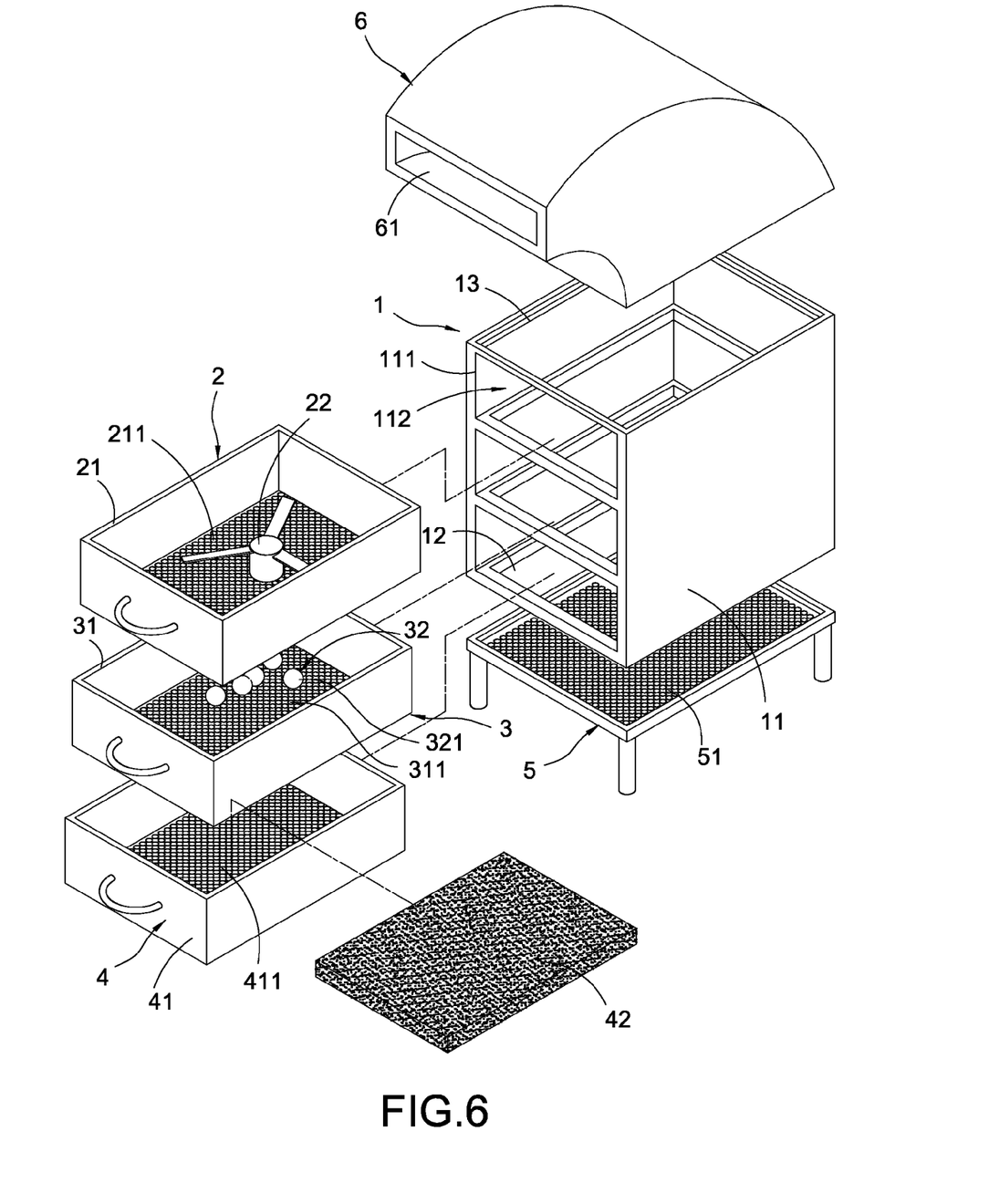
FIG. 6 is a perspective exploded view of the second embodiment of an energy storable air conditioning device of the invention.

The second embodiment of the invention is depicted in FIG. 6. The main body 1 includes a frame 11. The frame 11 has several longitudinally disposed openings 111 and each opening 111 corresponds to one of the receiving spaces 112. Since top and bottom of each frame 11 are opened, when the frames 11 are stacked, the opened top side and bottom side of the stacked structure of the frames 11 serve as the air outlet 13 and air inlet 12 respectively.

Figure 7:
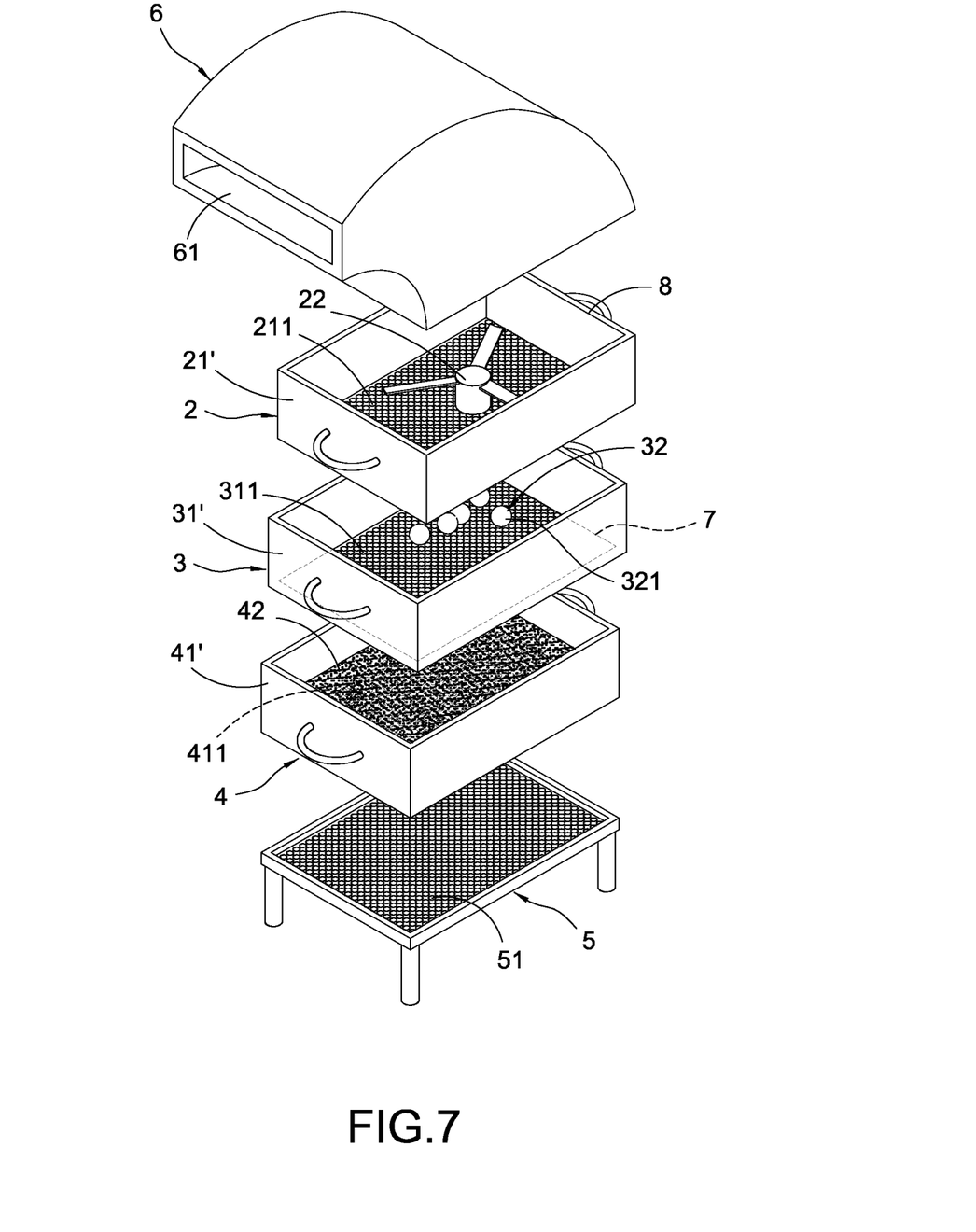
FIG. 7 is a perspective exploded view of the third embodiment of an energy storable air conditioning device of the invention.
Figure 8:
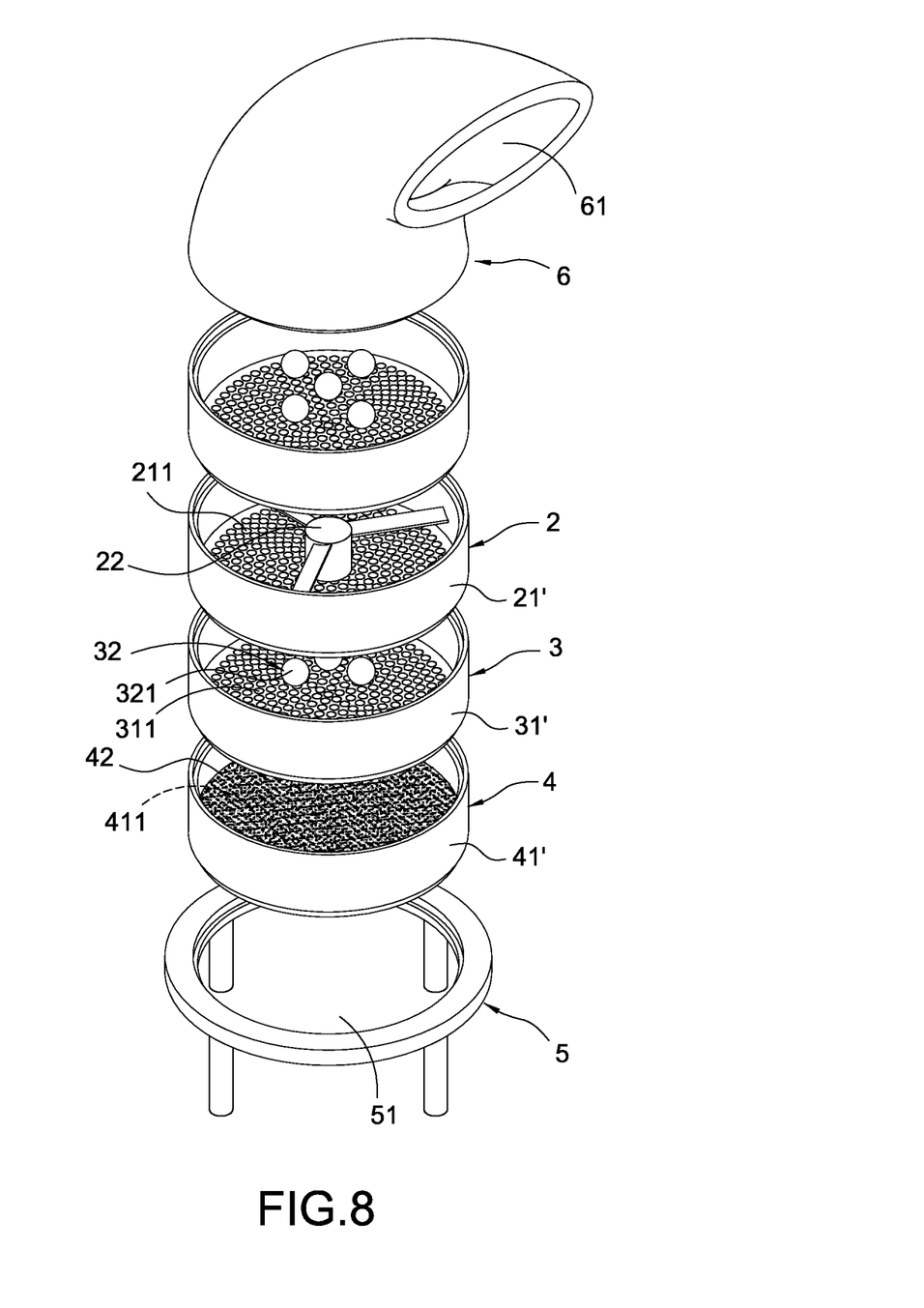
FIG. 8 is a perspective exploded view of the fourth embodiment of an energy storable air conditioning device of the invention.

FIGS. 7 and 8 depict the third and fourth embodiments of the invention. Each air blower module 2 includes a first main body 21' and a fan 22' disposed in the first main body 21'. The top of the first main body 21' is an opening, and the bottom of the first main body 21' has a meshed or porous structure 211.

Each energy storage module 3 includes a second main body 31' and an energy storage unit 32' disposed in the second main body 31'. The top of the second main body 31' is an opening and the bottom of the first main body 21' has a meshed or porous structure 311. As the first main body 21' is connected to the second main body 31', the top side and the bottom side of the connected structure of the first main body 21' and second main body 31' serve as an air outlet 8 and an air inlet 7. In FIGS. 7 and 8, the first main body 21' and the second main body 31' are stacked vertically.

The air intake module 4 includes a third main body 41' and the filtering unit 42 disposed in the third main body 41'. A meshed or porous structure 411 corresponding to the air inlet 7 is formed on the bottom side of the third main body 41'. The first main body 21', the second main body 31' and the third main body 41 are connected to each other.

The seat 5 is disposed on the bottom side of the third main body 41'. The venting portion 51 disposed on the bottom of the seat 5 corresponds to the meshed or porous structure 411. The seat 5 has several feet or wheels to support and keep the first main body 21', the second main body 31' and the third main body 41' away from the ground for a distance. In addition, the wheels facilitate movement of the air conditioning device. The cover 6 is disposed on the top side of the first main body 21'. The air guide slot 61 corresponds to the air outlet 8.

The venting portion 51 can be a meshed or porous structure or an opening. Although the first main body 21', the second main body 31' and the third main body 41' are square tubes or circular tubes in this embodiment, they are not limited thereto. The shape of the first main body 21', the second main body 31' and the third main body 41' can be other shapes according to requirement.

Since the first main body 21' and the second main body 31' can be combined by stacking them, and the fan 22 and the energy storage unit 32 are disposed in the first main body 21' and the second main body 31' respectively, the fan 22 and energy storage unit 32 are therefore modularized so that expansion and replacement of the air blower module 2 and energy storage module 3 are easier.

Figure 9:
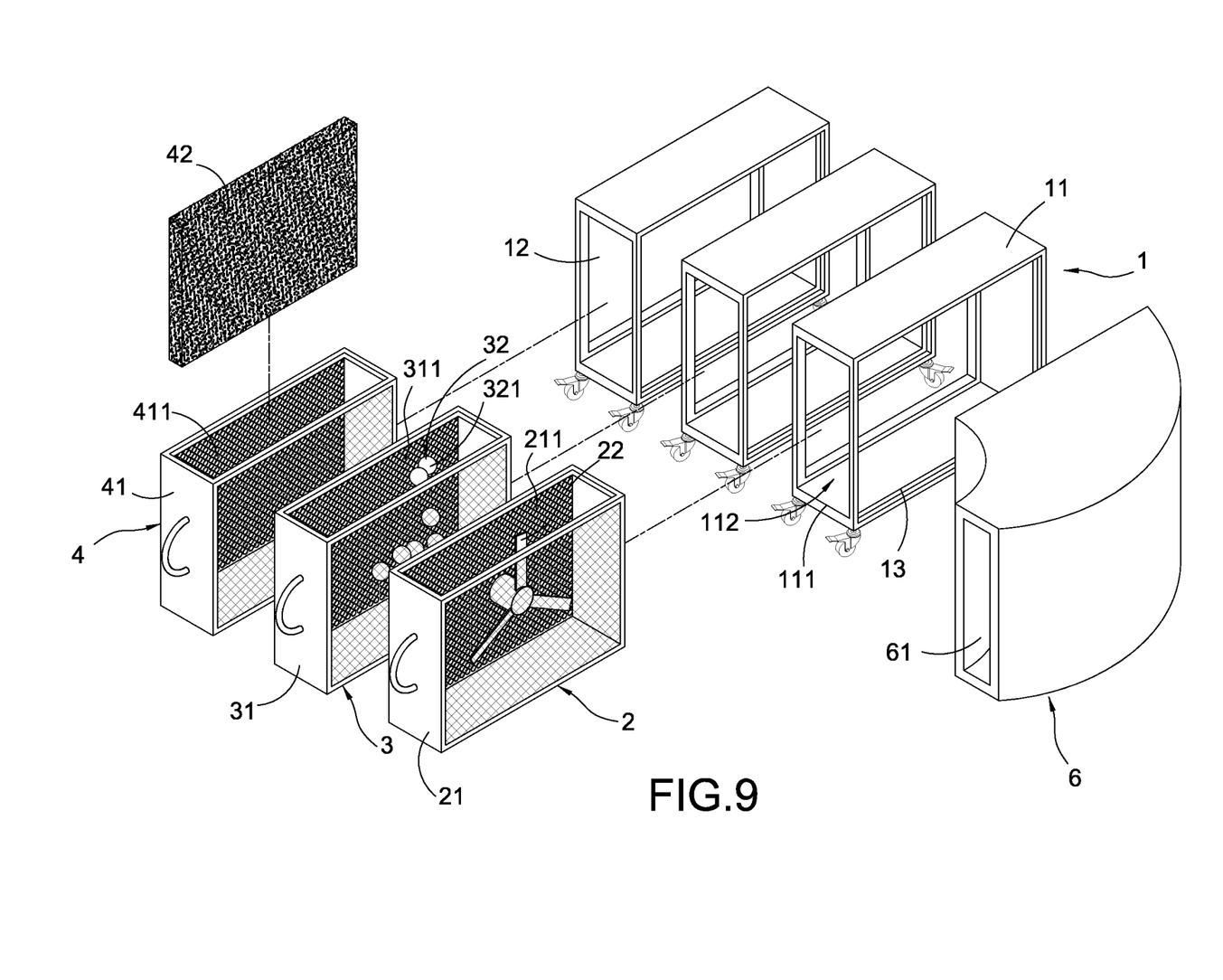
FIG. 9 is a perspective exploded view of the fifth embodiment of an energy storable air conditioning device of the invention.
Figure 10:
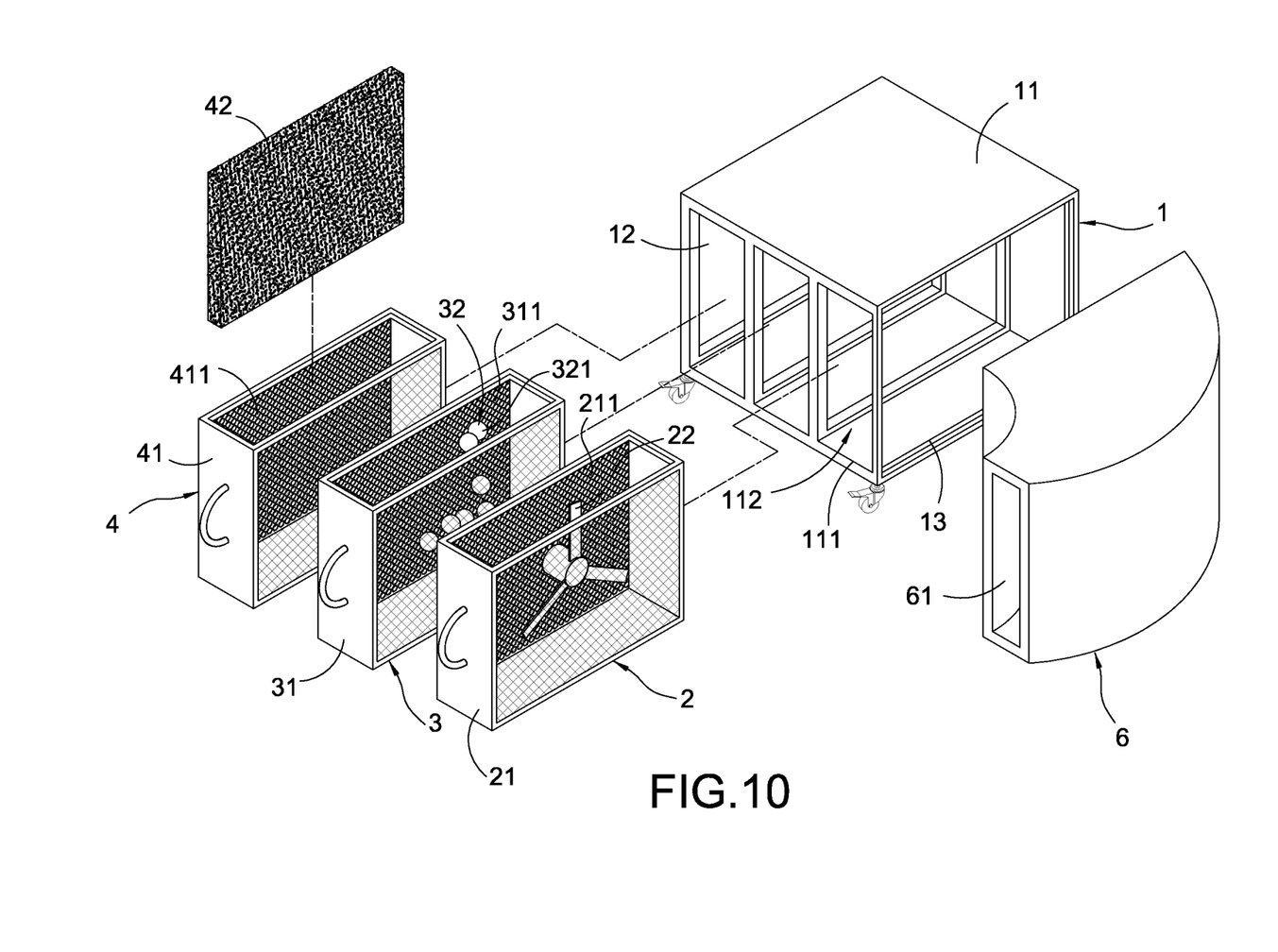
FIG. 10 is a perspective exploded view of the sixth embodiment of an energy storable air conditioning device of the invention.

FIGS. 9 and 10 depict the fifth and sixth embodiments of the invention respectively. The air inlet 12 and air outlet 13 are formed on left side and right side of the main body 1, and several receiving spaces 112 are connected to each other and formed between the air inlet 12 and air outlet 13.

The fifth embodiment is described as follows. The main body 1 includes several frames 11 stacked horizontally (side by side). Each frame 11 has an opening 111 corresponding to one of the receiving spaces 112. The air inlet 12 and air outlet 13 are formed on left side and right side of the main body 1. Each frame 11 has several feet or wheels to support the frames 11 and keep away from the ground for a distance. The wheels facilitate movement, replacement and attachment of the frames 11.

The sixth embodiment is described as follows. The main body 1 includes a frame 11 provided with openings 111 corresponding to the receiving space 112. The air inlet 12 and air outlet 13 are formed on left side and right side of the frame 11. The frame 11 has several feet or wheels to support the frames 11 and keep away from the ground for a distance. The air conditioning device is easily moved by the wheels.

The first drawer 21 has the meshed or porous structure 211, and the second drawer 31 has the meshed or porous structure 311 corresponding to the meshed or porous structure 211. In the fifth and sixth embodiments, the meshed or porous structure 211 is formed on the two opposite sides of the first drawer 21, and the meshed or porous structure 311 is formed on the two opposite sides of the first drawer 31. The first drawer 21 is connected to the second drawer 31.

While the invention has been described by way of example and in terms of preferred embodiment, it is to be understood that the invention is not limited thereto. To the contrary, it is intended to cover various modifications and similar arrangements (as would be apparent to those skilled in the Art). Therefore, the scope of the appended claims should be accorded the broadest interpretation so as to encompass all such modifications and similar arrangements.

What is claimed is:

1. An energy storable air conditioning device comprising:
    a main body having an air inlet, an air outlet and a plurality of receiving spaces connected to each other and formed between the air inlet and the air outlet;
    at least one air blower module comprising a first drawer inserted into one of the receiving spaces and a fan disposed in the first drawer; and
    at least one energy storage module comprising a second drawer inserted into another one of the receiving spaces and an energy storage unit disposed in the second drawer, wherein the first drawer is connected to the second drawer.

2. The energy storable air conditioning device as claimed in claim 1, wherein the main body comprises a frame having a plurality of openings corresponding to the receiving spaces formed in the frame.

3. The energy storable air conditioning device as claimed in claim 1, wherein the main body comprises a plurality of frames stacked vertically or horizontally, each frame has an opening corresponding to one of the receiving spaces formed in the frame, wherein the air inlet and air outlet are formed on a top side and a bottom side of the frame respectively or on lateral sides of the frame.

4. The energy storable air conditioning device as claimed in claim 1 further comprising an air intake module having a third drawer inserted into further another one of the receiving spaces and a filtering unit disposed in the third drawer, wherein a meshed or porous structure corresponding to the air inlet are formed on a bottom side or lateral side of the third drawer, and the first drawer, the second drawer and the third drawer are connected to each other.

5. The energy storable air conditioning device as claimed in claim 1, wherein a meshed or porous structure are formed on the first and second drawers.

6. The energy storable air conditioning device as claimed in claim 1 further comprising a seat disposed on a bottom side of the main body, wherein the seat has a venting portion corresponding to the air inlet.

7. The energy storable air conditioning device as claimed in claim 1 further comprising a cover disposed on a side of the main body, wherein the cover has an air guide slot corresponding to the air outlet.

8. The energy storable air conditioning device as claimed in claim 1, wherein the energy storage unit comprises a plurality of energy storage elements, and each of the energy storage elements has energy storage material in which energy is stored by phase change.

9. The energy storable air conditioning device as claimed in claim 8, wherein each energy storage element is flake-shaped, spherical or triangular.

10. An energy storable air conditioning device comprising:
    at least one air blower module comprising a first main body and a fan disposed in the first main body;
    at least one energy storage module comprising a second main body and an energy storage unit disposed in the second main body, wherein the first main body is connected to the second main body;
    an air intake module having a third main body; and
    a filtering unit disposed in the third main body, wherein a meshed or porous structure corresponding to an air inlet is formed on the third main body, and the first main body, the second main body and the third main body are connected to each other.

11. The energy storable air conditioning device as claimed in claim 10, wherein the first main body is stacked to the second main body.

12. The energy storable air conditioning device as claimed in claim 10, wherein the first main body and the second main body have correspondent meshed or porous structures.

13. The energy storable air conditioning device as claimed in claim 10 further comprising a seat disposed on a bottom side of the third main body, wherein the seat has a venting portion corresponding to the meshed or porous structure.

14. An energy storable air conditioning comprising:
at least one air blower module comprising a first main body and a fan disposed in the first main body;
at least one energy storage module comprising a second main body and an energy storage unit disposed in the second main body, wherein the first main body is connected to the second main body; and
a cover disposed on a side of the first main body and the second main body, wherein the cover has an air guide slot corresponding to an air outlet.

15. The energy storable air conditioning device as claimed in claim 10, wherein the energy storage unit comprises a plurality of energy storage elements, and each of the energy storage elements has energy storage material in which energy is stored by phase change.

16. The energy storable air conditioning device as claimed in claim 15, wherein each energy storage element is flake-shaped, spherical or triangular.

* * * * *